United States Patent
Quinif

(10) Patent No.: US 10,844,652 B1
(45) Date of Patent: Nov. 24, 2020

(54) LOW-ELASTICITY SPACER FOR HOLLOW-CORE STRUCTURES

(71) Applicant: Edward G Quinif, Scottsdale, AZ (US)

(72) Inventor: Edward G Quinif, Scottsdale, AZ (US)

( * ) Notice: Subject to any disclaimer, the term of this patent is extended or adjusted under 35 U.S.C. 154(b) by 0 days.

(21) Appl. No.: 16/784,497

(22) Filed: Feb. 7, 2020

(51) Int. Cl.
| | | |
|---|---|---|
| *B32B 3/28* | (2006.01) | |
| *E06B 3/70* | (2006.01) | |
| *B32B 29/08* | (2006.01) | |
| *B32B 29/00* | (2006.01) | |
| *B32B 27/08* | (2006.01) | |
| *B32B 21/06* | (2006.01) | |

(52) U.S. Cl.
CPC ............. *E06B 3/7015* (2013.01); *B32B 3/28* (2013.01); *B32B 27/08* (2013.01); *B32B 29/005* (2013.01); *B32B 29/08* (2013.01); *B32B 21/06* (2013.01); *E06B 3/7001* (2013.01); *E06B 2003/7019* (2013.01); *Y10T 428/24694* (2015.01)

(58) Field of Classification Search
CPC .. B32B 3/04; B32B 3/26; B32B 21/06; Y10T 428/24694; Y10T 3/28
See application file for complete search history.

(56) References Cited

U.S. PATENT DOCUMENTS

| | | | |
|---|---|---|---|
| 2,725,604 A | 12/1955 | Loetscher | |
| 4,784,270 A * | 11/1988 | Layer | B65D 81/054 206/320 |
| 5,042,713 A * | 8/1991 | Stafford | B65D 5/32 229/117.01 |
| 5,167,105 A | 12/1992 | Isban | |
| 5,832,692 A | 11/1998 | Opferbeck | |
| 5,875,608 A | 3/1999 | Quinif | |
| 5,875,609 A | 3/1999 | Quinif | |
| 5,992,127 A | 11/1999 | Quinif | |
| 6,132,836 A | 10/2000 | Quinif | |
| 6,412,251 B1 | 7/2002 | Early | |
| 9,777,532 B2 | 10/2017 | Parish | |
| 9,790,734 B1 | 10/2017 | Isban | |

* cited by examiner

*Primary Examiner* — Donald J Loney
(74) *Attorney, Agent, or Firm* — Etherton Law Group, LLC

(57) ABSTRACT

An expandable, low-elasticity spacer made of two-sided corrugated material having a topsheet, a bottomsheet, and a corrugated sheet therebetween forming flutes. The spacer comprises two strips of the corrugated material, joined together to form a polygon having inside and outside corners. Each outside corner of the polygon has a slit parallel to the flutes that severs the continuity of the sheet in which it is made, eliminating the ability of the discontinuous portions to pull against each other, thereby eliminating potential spring back. The spacer is perforated, scored or crimped parallel to the flutes in one or more of the inside corners to make it easier to bend the spacer at the desired fold line. Because the spacer avoids springing back to its collapsed position, it can be sized to fill a cavity with no excess material and leave no unintended gaps. The corrugated material is preferably fiberboard or plastic.

20 Claims, 12 Drawing Sheets

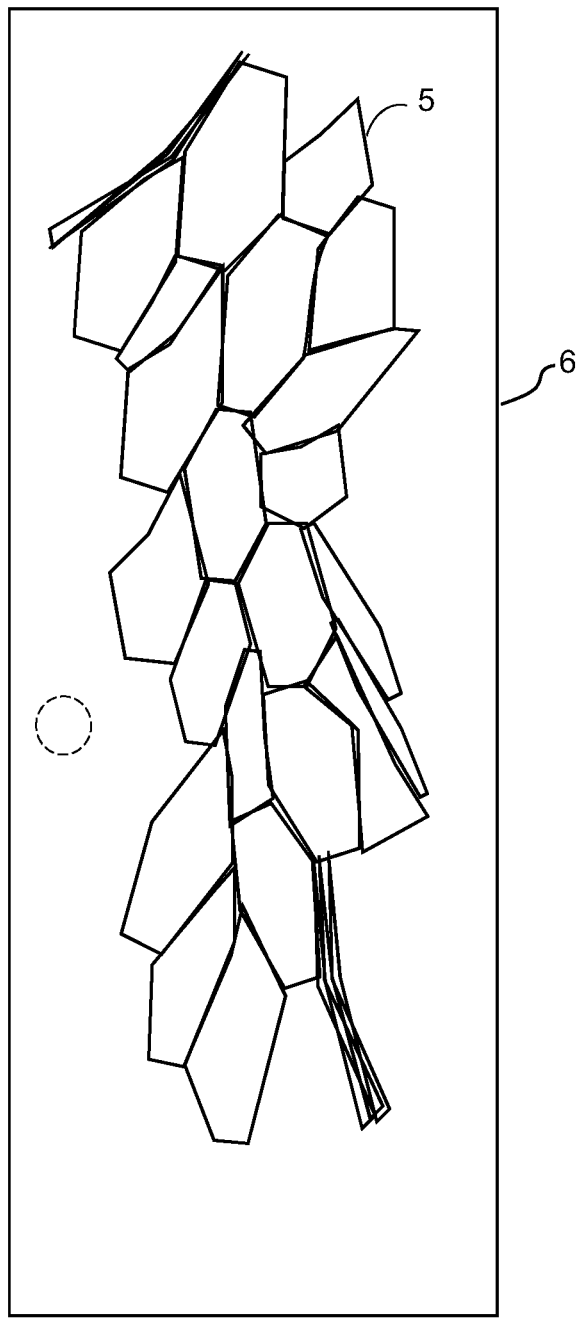
FIG. 1   *PRIOR ART*

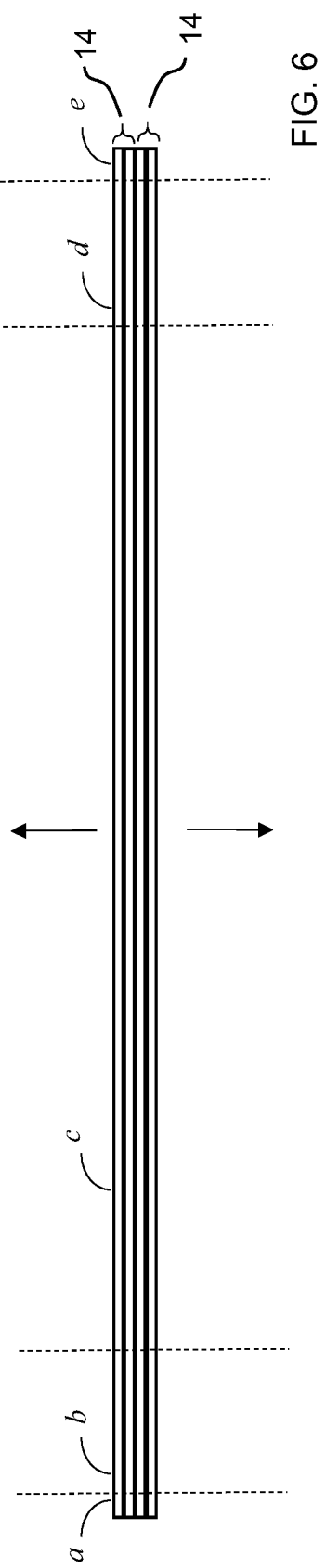
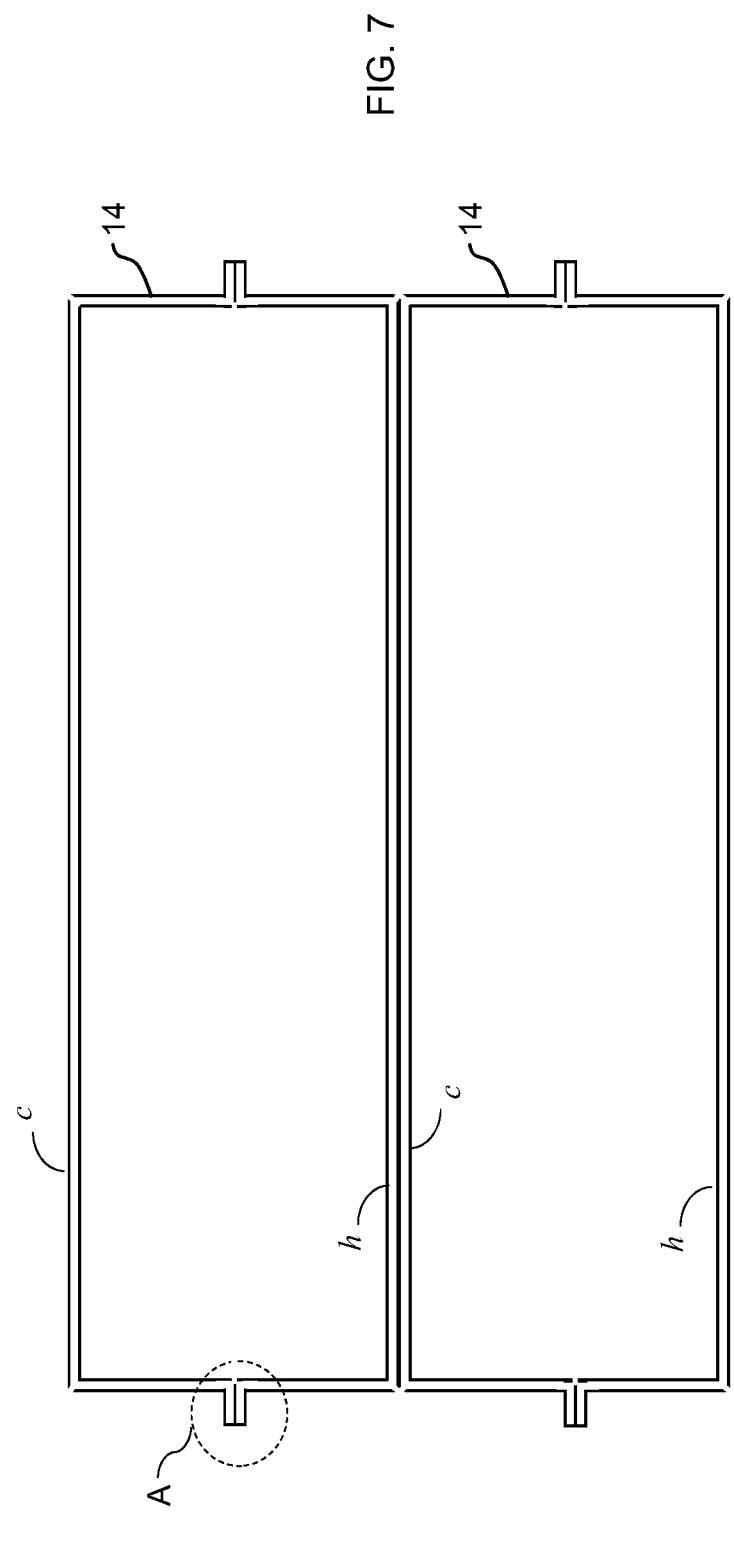
FIG. 6
FIG. 7

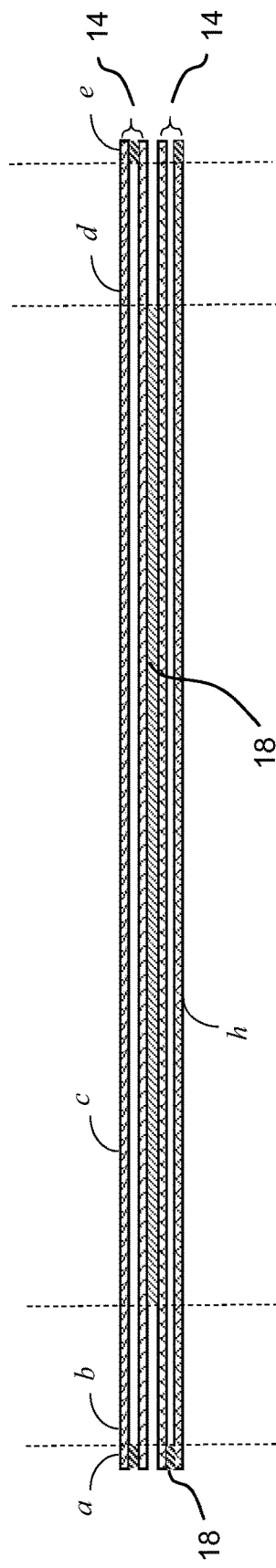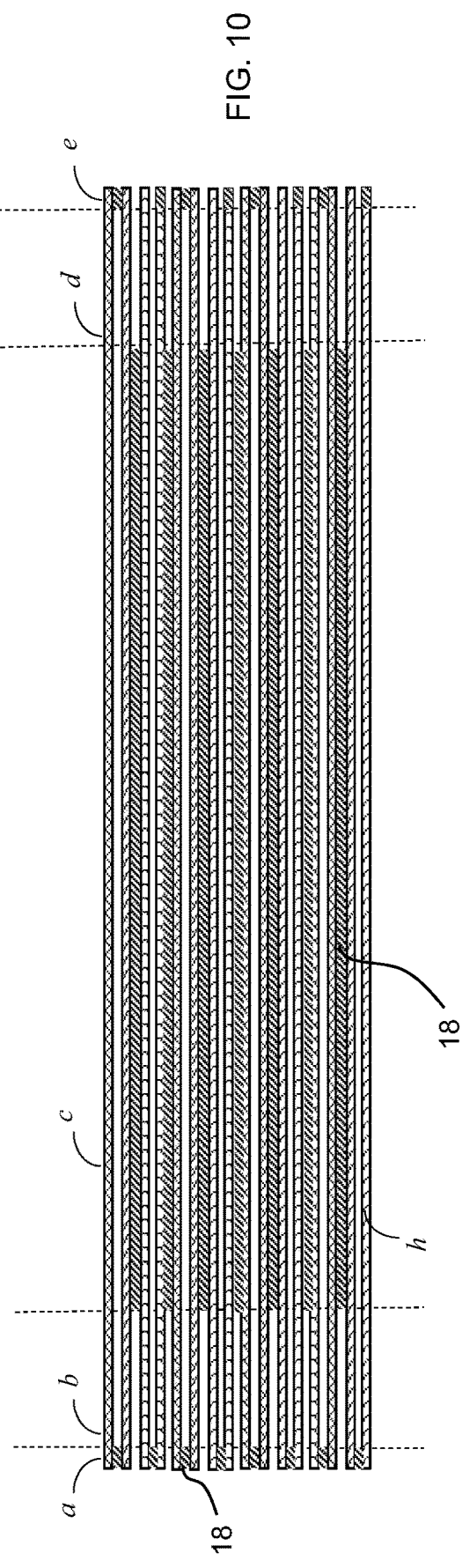

LOW-ELASTICITY SPACER FOR HOLLOW-CORE STRUCTURES

FIELD OF INVENTION

This invention relates generally to hollow structures made of two parallel skins that form an internal hollow space. This invention relates specifically to a low-elasticity spacer inserted into the hollow space which provides structural support uniformly between the skins.

BACKGROUND

Hollow-core doors are commonly used in many types of buildings. The common structure of a hollow-core door includes a pair of door skins that are connected at their perimeters by a rectangular frame, which holds the skins apart to form a hollow space. The skins are commonly made of medium-density fiberboard (MDF), which is an engineered wood product made by combining wood fibers with a binder, and applying high temperature and pressure to mold the fibers into a desired shape. The skins may be formed into completely flat, planar surfaces that are parallel to each other, forming what is known as a flush door, which gives the door a uniform thickness and constant internal width.

Alternatively each skin may be formed into a contoured surface with one or more molded panels recessed into the exterior surface of the door, which creates raised panels and panel ridges on the hollow inside of the door. As used herein, parallel skins means that a plane of the bottom skin is parallel to a plane of the top skin, even though the skins may be comprised of multiple planes due to the raised panels. The width of the hollow space between the skins may vary across the length and width of the door, where it is reduced by the depth of the raised panel on each skin. This gives a paneled door a non-uniform thickness on the outside and between the skins.

Hollow-core doors are less structurally sound than solid doors, and more prone to twist and bend. In addition, some hollow-core door skins are so thin that, over the length of a door, the skins tend to sag inwards toward each other. To give the door structural rigidity and prevent the skins from falling into the hollow core, a support structure is placed in the hollow core between the skins and adhered to them. A lock block may also be included in the area of the door where locks and handles are attached to provide the additional support that is needed to secure a lock in the door. The support structures are usually made of corrugated fiberboard.

Corrugated fiberboard is made of a fluted sheet of fiberboard adhered between two flat sheets of fiberboard. Single-sided corrugated fiberboard adheres the fluted sheet to only one flat sheet and is significantly weaker than two-sided corrugated fiberboard. Corrugated fiberboard is very resistant to being crushed in a direction parallel to the lengthwise axis of the flutes. Corrugated fiber board is relatively elastic, meaning that when a sheet is deformed under load on a fold line parallel to the lengthwise axis of the flutes, it has a strong tendency to regain its original dimensions when unloaded. Consequently, for example, if a straight length of corrugated fiberboard is folded by pinching the ends of the length together along a fold line parallel to the flues, the length will try to straighten out again. Corrugated fiberboard thus has the ability to spring back nearly to its initial state after being stretched or folded.

Commonly spacers are made of interconnected straight lengths of corrugated fiberboard. The strips are interconnected in ways that permit the strips to move relative to one another, akin to an accordion or folding security gate, so that the spacers may be collapsed into a small form factor for transport and storage. Then, when a spacer is needed for installation in a hollow core door, the spacer is expanded to the desired size and open cells are formed between the strips.

Hollow-core doors are assembled lying flat on a horizontal surface. A bottom door skin is positioned on the horizontal surface with its inside surface facing up. Then one or more spacers is placed on the bottom skin and the top skin is placed on top of the spacer(s), forming the door with the hollow interior. The orientations of "top" and "bottom" referenced herein relate to doors and door skins lying horizontally, as opposed to the upright position a door is in when it is opened and closed within a door jamb and lintel. The spacers used today are collapsible or compressible.

To install the spacer between skins, glue is applied to both sides of the unexpanded form of the spacer and it is then stretched across one skin of the interior of the door. The second skin is placed on the open glue-covered top surface of the spacer to form the door. Ideally the spacer cells are uniformly spaced between the skins to provide uniform support throughout the hollow-core structure. One problem with using such an expandable spacer is that it is difficult to stretch in a way that achieves an even grid pattern within the door. Commonly, the spacer must be overstretched and then manipulated into place, all the time fighting the tendency of the spacer to collapse toward its unexpanded configuration. This process is labor-intensive and thus not a cost-effective manner for manufacturing the door. In addition, these expandable spacers fully extend between the horizontal rails and vertical stiles with the intent to completely fill the hollow interior. But, due to the tendency of the spacer to collapse more spacer material is inserted within the interior of the door than is actually required to fill it. The extra core material increases the cost of the door. Another problem with known expandable spacers is that, due to the elasticity, the spacers retract towards their unexpanded state and tend to leave unfilled areas that have no support. The speed of manufacturing prevents the adhesive from fully curing before the skins are sealed over the spacer. Consequently, the spacer shrinks from its fully expanded configuration that fills the hollow core to a retracted configuration that leaves gaps in the grid. The amount of retraction depends on the structure of the spacer and material it is made from. Known expandable spacers made from corrugated fiberboard have high elasticity.

FIG. 1 (PRIOR ART) shows the effect of expandable spacers that spring back. The top skin has been removed from a hollow-core door 6 to reveal that a honeycomb-type expandable spacer 5 with hexagonal cells has spring-back to a collapsed configuration. In the upper left and lower right corners of the door the collapse is complete, such that spacer has reverted completely to its initial, unexpanded form. In other locations the hexagonal cells have partially collapsed. The result is that the spacer does not uniformly fill the interior space, weakening the door an increasing the likelihood of collapse where the spacer is absent.

Despite the elasticity problem, expandable corrugated fiberboard door support structures are popular in the art. For example, U.S. Pat. No. 5,875,608 discloses an expandable spacer that is made of rigid elongated members connected at intersections to foldable connecting members. The elongated members can be collapsed parallel together at the intersections by folding the connecting members, similar to an accordion. When held in an expanded configuration, the elongated and connecting members are at right angles to each other to form a grid or honeycomb pattern. Enough elongated and connecting members are used that the resultant grid fills nearly the entire hollow core. However, once the force holding the elongated and connecting members in the expanded configuration is relieved, the members tend to return to the collapsed position, most often only partially but sometimes fully to the initial position. This type of support structure does not provide uniform support within a paneled door, because the spacer tends to spring back to its collapsed position, leaving sizeable gaps between the spacer and the skins where there are no raised panels.

U.S. Pat. No. 5,875,609 discloses another expandable spacer which accommodates the raised panels by cutting notches in the elongated members where they will cross the raised portions of the panel. The connecting members are not notched. U.S. Pat. No. 5,992,127 discloses another expandable spacer in which both the elongated members and connecting members are notched to accommodate the raised panel portions. Again, enough elongated members and connecting members are used that the resultant grid fills nearly the entire hollow core, resulting in high cost and weight. Unfortunately, these notched expandable spacers are difficult to install because the honeycomb does not stretch evenly, and the notches permit the members to twist and bend at the thinned area, so the spacers are difficult to align where desired. In addition, these notched expandable spacers tend to spring back to their original position unless physically held in the expanded position.

Tens of thousands of hollow-core doors are made daily in the US; millions every year. Even small reductions of the amount of material, glue, and labor in the manufacturing process can save millions of dollars. Therefore, it is an object of this invention to provide an internal support for a paneled hollow-core door that has a reduced tendency to spring back to its folded configuration, uses less paper and glue, has a lower cost of materials and labor, takes less time to assemble, installs in an even grid to fit the hollow cavity and remains that way, and provides more strength to the door than known supports.

SUMMARY OF THE INVENTION

An expandable, low-elasticity spacer is made of two-sided corrugated material having a topsheet, a bottomsheet, and a corrugated sheet therebetween forming flutes. The spacer comprises two strips made of the corrugated material, joined together to form a polygon having inside corners and outside corners. Each outside corner of the polygon has a slit parallel to the flutes that severs the continuity of the sheet in which it is made, eliminating the ability of the discontinuous portions to pull against each other, thereby eliminating potential spring back. Optionally the spacer is perforated, scored or crimped parallel to the flutes in one or more of the inside corners to make it easier to bend the spacer at the desired fold line. Because the spacer avoids springing back to its collapsed position, it can be sized to fill a cavity with no excess material and leaves no unintended gaps. The corrugated material is preferably fiberboard or plastic.

BRIEF DESCRIPTION OF THE DRAWINGS

FIG. 1 (PRIOR ART) is a top view of the inside of a hollow door with a partially collapsed spacer.

FIG. 6 is a top view of a two-cell spacer of the present invention in its collapsed configuration.

FIG. 7 is a top view of the spacer of FIG. 6 in its expanded configuration.

FIG. 9 is an exploded top view of the collapsed two-cell spacer of FIG. 6.

FIG. 10 is an exploded top view of the present spacer having eight cells in a collapsed configuration.

DETAILED DESCRIPTION OF THE INVENTION

The present invention is an expandable spacer made from corrugated material which, once expanded from its collapsed configuration, does not spring back towards its collapsed configuration. Corrugated material has a topsheet 2, a bottomsheet 4, and a corrugated sheet 3 therebetween forming flutes. See FIGS. 2A-C and FIGS. 3A-C. This invention takes advantage of the structure of two-sided corrugated material by making a slit through one sheet of the material while leaving the rest of it intact. Severing the continuity of the sheet eliminates the ability of the discontinuous portions to pull against each other, thereby eliminating spring back. The invention optionally takes advantage of another feature of the structure of two-sided corrugated material by perforating, scoring or crimping the un-slit sheet of the material at desired fold lines, weakening it enough to reduce or eliminate spring-back while retaining continuity. The spacers of the present invention are explained generally in the context of a hollow-core door, but may also be used in other hollow-core structures, such as tabletops, kick plates, privacy panels for desks, shelves, mantles, and the like. The corrugated material is typically fiberboard, cardboard, paper, polypropylene or other plastic.

Figure 2A:
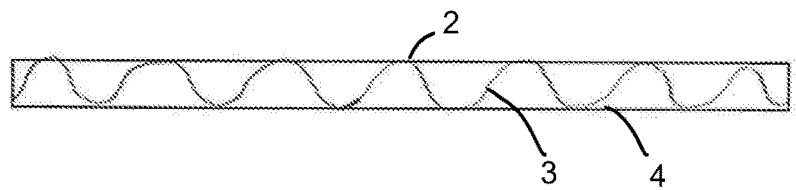
FIG. 2A (PRIOR ART) is a top view of a portion of corrugated fiberboard in its original resting configuration.
Figure 2B:
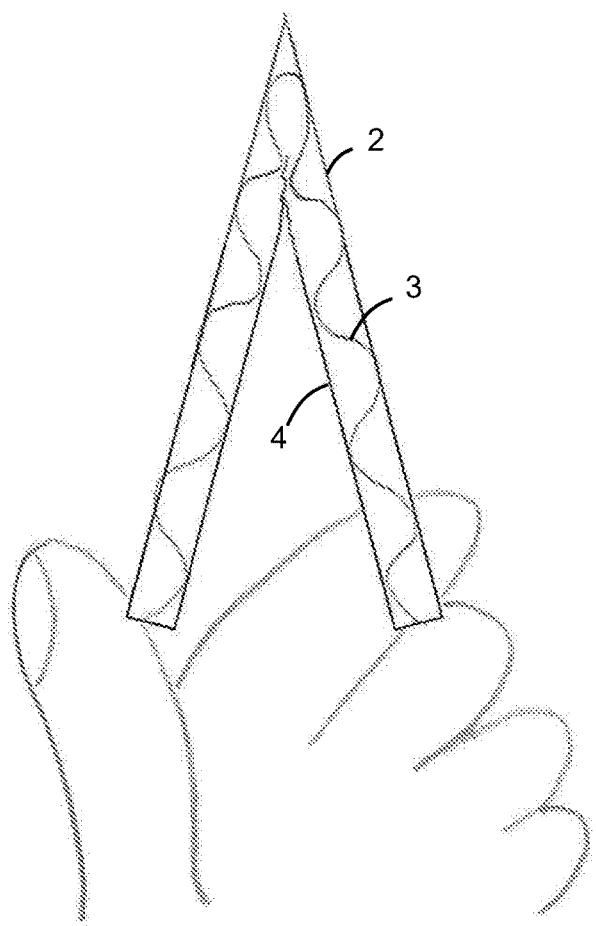
FIG. 2B (PRIOR ART) is a top view of the portion of FIG. 2A under load to fold the portion into a collapsed position.
Figure 2C:
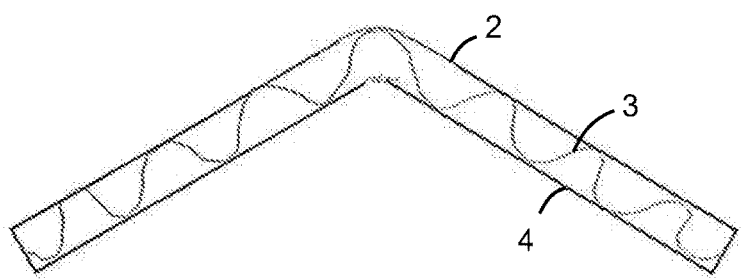
FIG. 2C (PRIOR ART) is a top view of the portion of FIG. 2B with no load, in its resting position after being folded.

FIG. 2A (PRIOR ART) shows top view of a portion of corrugated material in its original resting configuration, with continuous topsheet 2 and bottomsheet 4. FIG. 2B (PRIOR ART) shows the same portion of corrugated material under load (as indicated by pinching fingers) to fold the portion into a collapsed position. Note that the topsheet 2 remains continuous even when folded. FIG. 2C (PRIOR ART) illustrates the consequence when the load is removed: the portion remains bent. The tension of the topsheet 2 has pulled the portion back towards its original resting state and therefore is retracted into a partially-collapsed resting position after being folded.

Figure 3A:
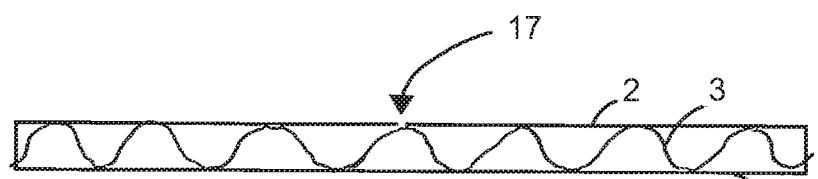
FIG. 3A is a top view of a portion of corrugated fiberboard spacer of the present invention in its original resting configuration.
Figure 3B:
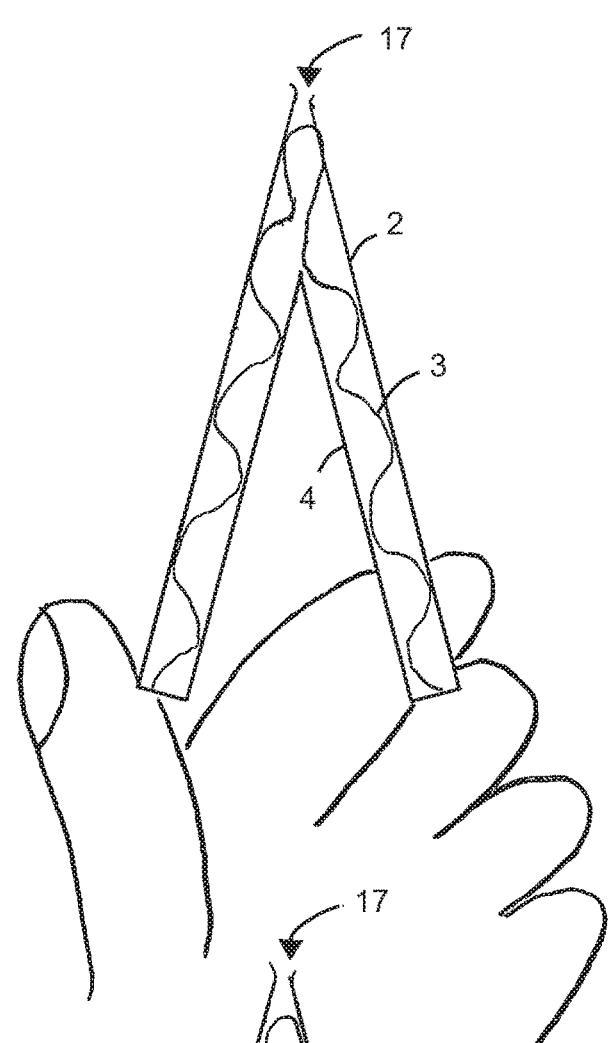
FIG. 3B is a top view of the spacer of FIG. 3A under load to fold the spacer into a collapsed position.
Figure 3C:
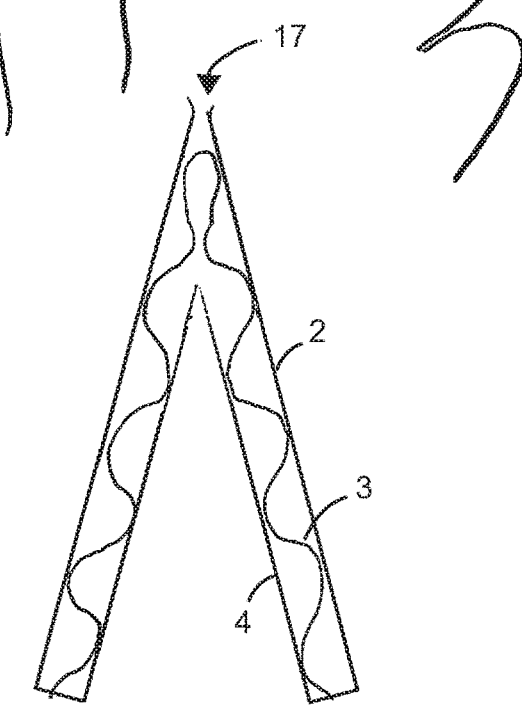
FIG. 3C is a top view of the spacer of FIG. 3B with no load, in its resting position after being folded.

FIG. 3A shows top view of a portion of corrugated material of the present invention in its original resting configuration, with a discontinuous continuous topsheet 2 due to the slit 17. FIG. 3B shows the same portion of corrugated material under load (as indicated by pinching fingers) to fold the portion into a collapsed position. FIG. 3C shows the portion when the load is removed: it remains folded to the same degree as when loaded because the discontinuity of the topsheet 2 eliminates the tension that causes the spring back.

Figure 4A:
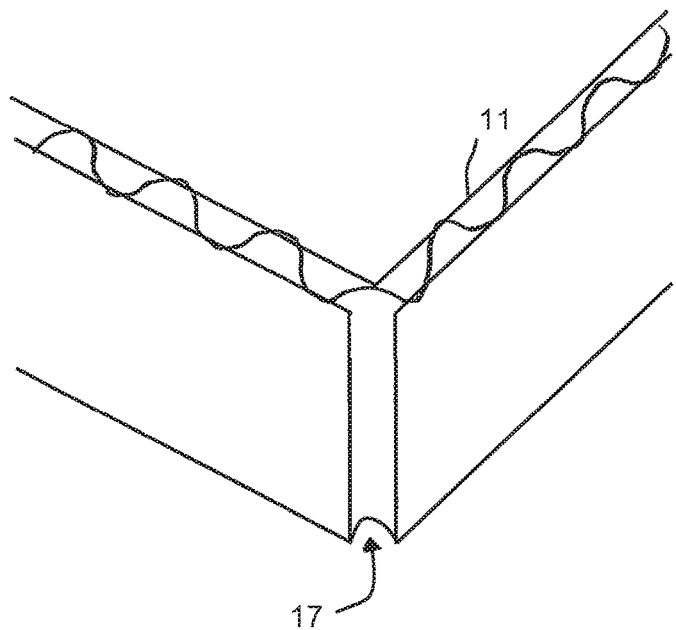
FIG. 4A is a top perspective view of an outside corner of the present spacer showing the slit.
Figure 4B:
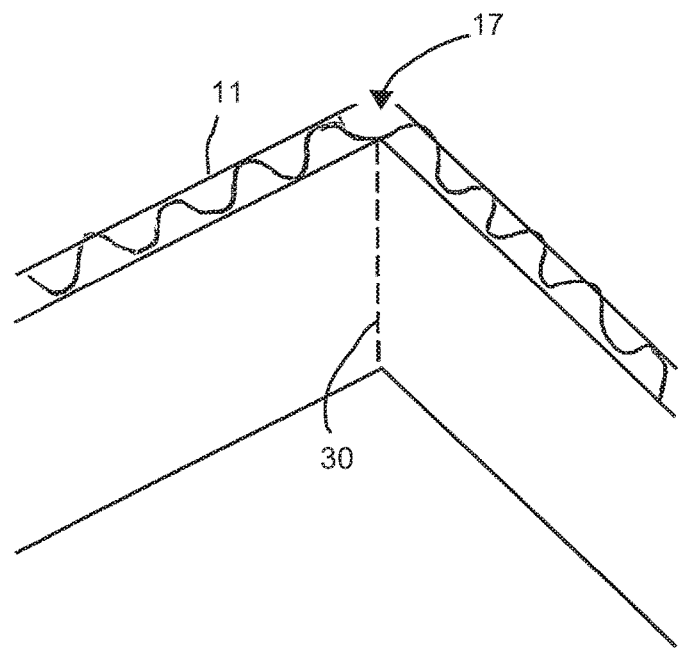
FIG. 4B is a rear perspective view FIG. 4A showing the inside corner of the present spacer and the optional perforations.

The present spacer comprises a series of cells 14 which as used herein means any of variously-shaped small compartments or bounded areas forming part of a whole. Each cell is a polygon made of one or more strips 11, 12 of corrugated material, bendable in certain locations to form inside corners and outside corners. Each polygon may be an open or closed polygon. Each outside corner has a slit 17 parallel to the flutes. FIG. 4A shows an outside corner of a strip 11 of the present spacer, with the discontinuous portions gaping open due to the slit 17. FIG. 4B is the rear view of FIG. 4A, and shows an inside corner of strip and the optional perforations 30. The inside corner may also be scored or crimped in lieu of or in addition to being perforated to make it easier to bend the spacer at the desired fold line and avoid spring back.

Figure 5:
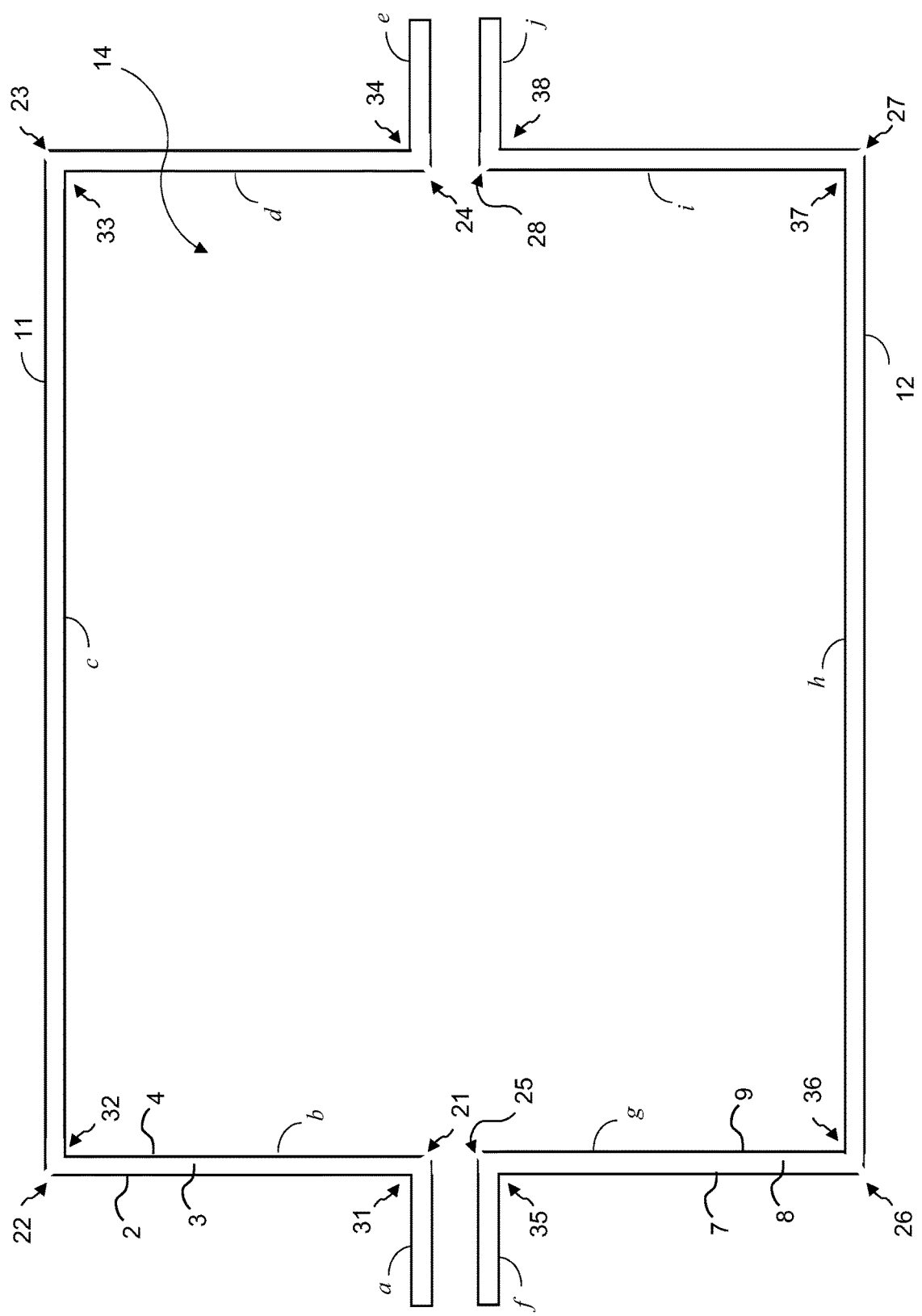
FIG. 5 is a top exploded view of a single cell of the present spacer.

FIG. 5 shows an expanded configuration of one embodiment of a cell 14 of the present spacer taking the shape of a rectangle. A first strip 11 of corrugated material comprises at least five portions a, b, c, d, and e. For clarity in this drawing, the corrugation is not shown in the first strip. There are four outside corners in this first strip 11, each having a slit parallel to the flutes: a first slit 21 on the bottomsheet 4 between portions a and b; a second slit 22 on the topsheet 2 between portions b and c; a third slit 23 on the topsheet 2 between portions c and d; and a fourth slit 24 on the bottomsheet 4 between portions d and e. There are four inside corners in the first strip 31, 32, 33 and 34 formed in the topsheet 2 between portions a and b; in the bottomsheet 4 between portions b and c; in the bottomsheet 4 between portions c and d; and in the topsheet 2 between portions d and e, respectively. The sheets of the inside corners may be continuous or may be perforated, scored, or crimped to make it easier to bend the spacer at the desired fold line and avoid spring back.

A second strip 12 of corrugated material comprises at least five portions f, g, h, i, and j. For clarity in this drawing, the corrugation is not shown in the second strip. There are four outside corners in this second strip 12, each having a slit parallel to the flutes: a fifth slit 25 on the bottomsheet 9 between portions f and g; a sixth slit 26 on the topsheet 7 between portions g and h; a seventh slit 27 on the topsheet 7 between portions h and i; and an eighth 28 slit on the bottomsheet 9 between portions i and j. There are four inside corners in the second strip 35, 36, 37 and 38 formed in the topsheet 7 between portions f and g; in the bottomsheet 9 between portions g and h; in the bottomsheet 9 between portions h and i; and in the topsheet 7 between portions i and j. The sheets of the inside corners may be continuous or may be perforated, scored, or crimped.

The first strip 11 and second strip 12 are connected to each other to form a polygon. Preferably the bottomsheet 4 of portion a is attached to the bottomsheet 9 of portion f; and the bottomsheet 4 of portion e is attached to the bottomsheet 9 of portion j. The polygon can be collapsed so the first strip 11 and second strip 12 are parallel. Polygons can be connected to each other to form a spacer with a series of cells, each attached to its neighbor cell at at least one location. When a portion of one cell is attached to its neighbor cell, a double-strip structure is formed, which adds additional structural support relative to a single-strip portion.

Figure 8:
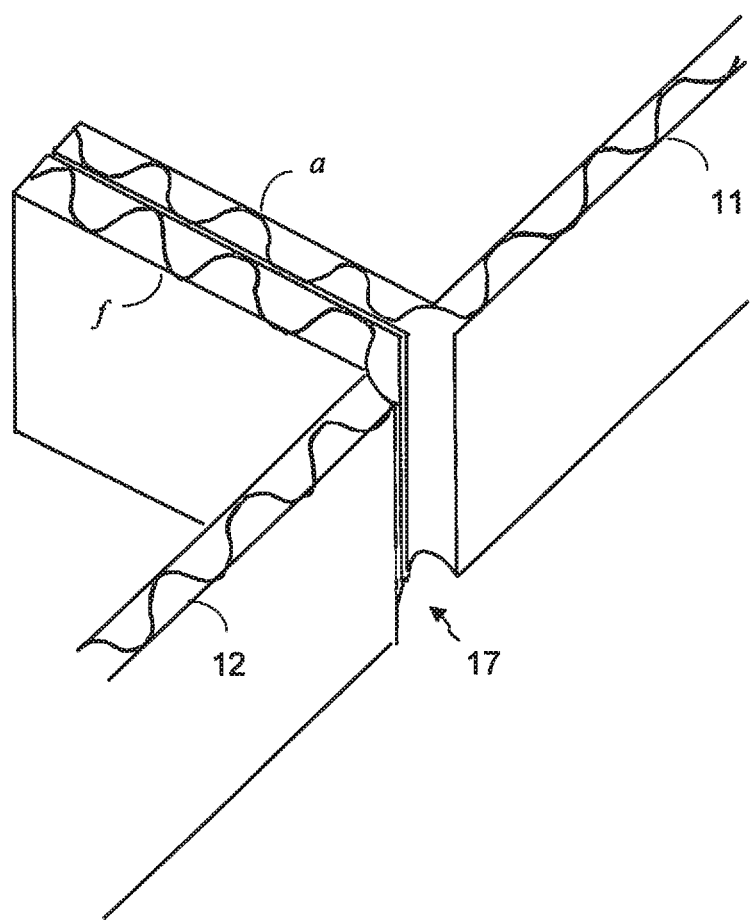
FIG. 8 is a close up, top perspective view of the portion labelled A of FIG. 7.

FIG. 6 shows two attached polygonal cells 14 in their unexpanded resting state. For clarity in this drawing, the corrugation is not shown. Portions a, b, c, d, and e of FIG. 5 are indicated in FIG. 6 by dotted lines. The arrows of FIG. 6 indicate the directions of expansion. FIG. 7 shows the two cells of FIG. 6 in their expanded configuration. FIG. 7 shows portions c and h of each cell. For clarity in this drawing, the corrugation is not shown. Portion h of the upper cell is attached to portion c of the lower cell to form a double-wall structure. FIG. 8 is a close-up view of the portion of FIG. 7 labelled as A.

The portions of the sheets of corrugated material that are connected to each other are preferably connected with adhesive 18. FIG. 9 is an exploded view of two polygonal cells in their unexpanded resting state to show where adhesive 18 has been applied, namely to connect portions a and f of each cell, as well as portion h of the upper cell and c of its neighbor lower cell. Typically adhesive 18 is applied to the corrugated material by spraying or rolling glue along topsheet or bottom sheet, as required. The corrugated material may be connected in other ways, including for example mechanical means such as staples or interleaving, sonic or vibrational welding, and tape, depending on the corrugated material. Due to the nature of the strips and adhesive, the present spacer is particularly suited to robotic manufacturing, which can move quickly and accurately enough to avoid over-application of the glue and quickly enough to avoid the glue drying out before assembly is complete. FIG. 10 is an exploded view of eight polygonal cells in their unexpanded resting state to show where adhesive has been applied. Again, adhesive 18 has been applied to connect portions a and f of each cell, as well as portion h of each upper cell and c of its neighbor lower cell.

The strips are manufactured in strips or stacks of strips in the collapsed configuration so that they can be transported and stored in a smaller form factor than in an expanded configuration. In a preferred method of installing a spacer in a hollow-core structure such as a door, adhesive is applied to the top and bottom edges of the spacer in its collapsed configuration, typically by spraying or rolling the glue along the open ends of the flutes. The glue-covered spacer is unfurled to its desired expanded configuration in the desired size and shape, and placed on the inside surface of a bottom door skin. The unfurling is akin to unfurling a folded bedsheet in that it does not spring back, in contrast to unfurling an accordion-folded paper fan which does spring back. The topsheets, bottomsheets, and flutes are perpendicular to the skin. The top skin is then placed on to on top of the glue-covered spacer, forming the door with the hollow interior. Because the spacer has no tendency to spring back, the spacer has dimensions to fill the hollow cavity with no excess material. The present spacer does not need to be overstretched or manipulated into place because it does not tend to collapse toward its unexpanded configuration. This process is thus far less labor-intensive than earlier spacers and thus is more cost-effective for manufacturing the door.

Because it does not spring back, it stays in place until the adhesive cures, filling the hollow cavity, leaves no unintended gaps, and has no excess material. This embodiment is particularly suited to assembly using robotics, which can move quickly and accurately enough to avoid over application of the glue and quickly enough to avoid the glue drying out before assembly is complete.

In an alternative embodiment, the adhesive is initially applied first only to the bottom edge of the spacer and then, once the spacer has been expanded and placed on the bottom skin, more adhesive is applied to the upper edge of the spacer. Again, because the spacer has no tendency to spring back to its collapsed configuration, it is sized to fill the cavity and it stays in place until the adhesive cures, leaving no unintended gaps and having no excess material.

Figure 11:
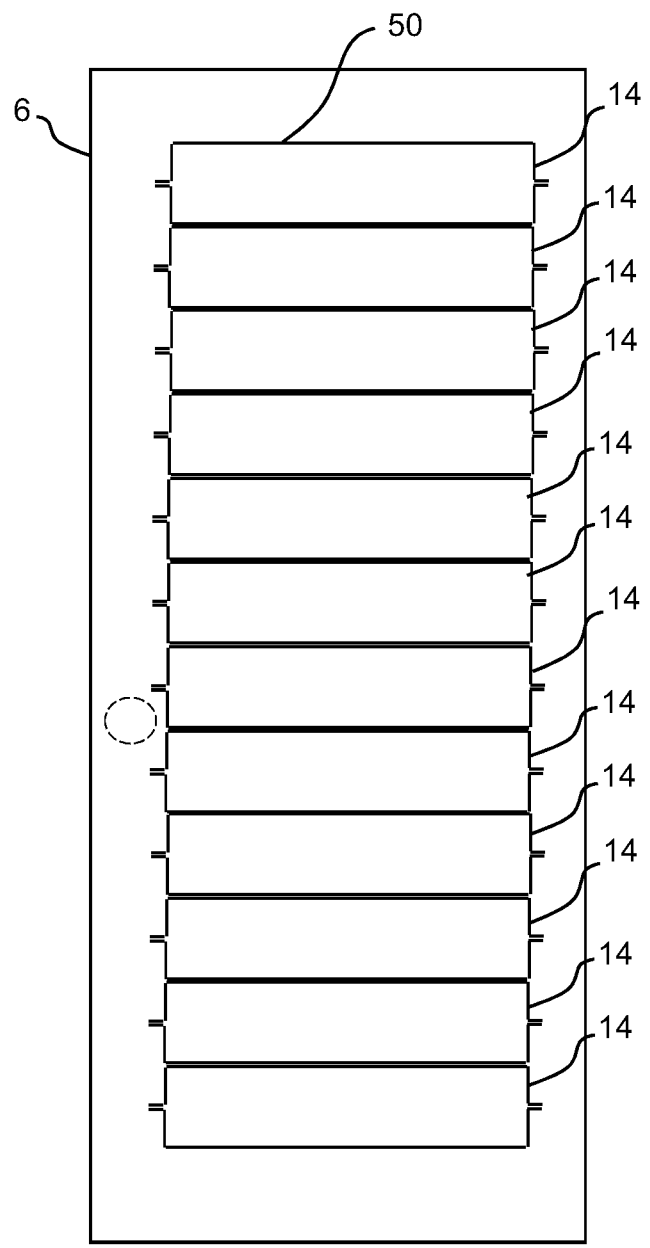
FIG. 11 is a top view of the inside of a hollow door with one embodiment of the present spacer in an expanded configuration.
Figure 12:
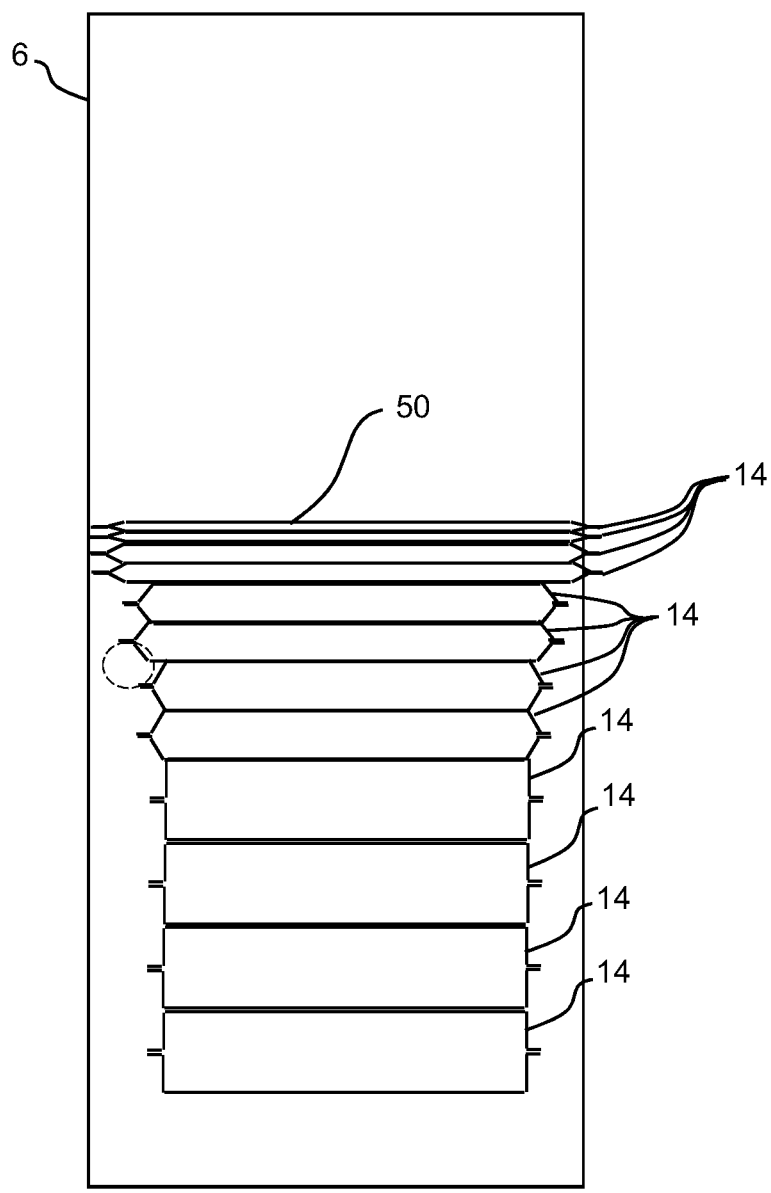
FIG. 12 is a top view of the inside of a hollow door with the spacer of FIG. 11 in a partially-expanded configuration.

Two or more spacers can be connected together at at least one portion to form a ladder-like structure. The "rungs" of the ladder are double-wall structures, increasing the strength of the support. FIG. 11 shows a twelve-cell ladder 50 installed in a hollow-core door 6. Each cell 14 is a rectangle with a width of about 6 inches connected in series. Each ladder 50 has a first cell, a last cell, and in this embodiment, ten intermediate cells. FIG. 12 shows the ladder partially unfurled.

Figure 13:
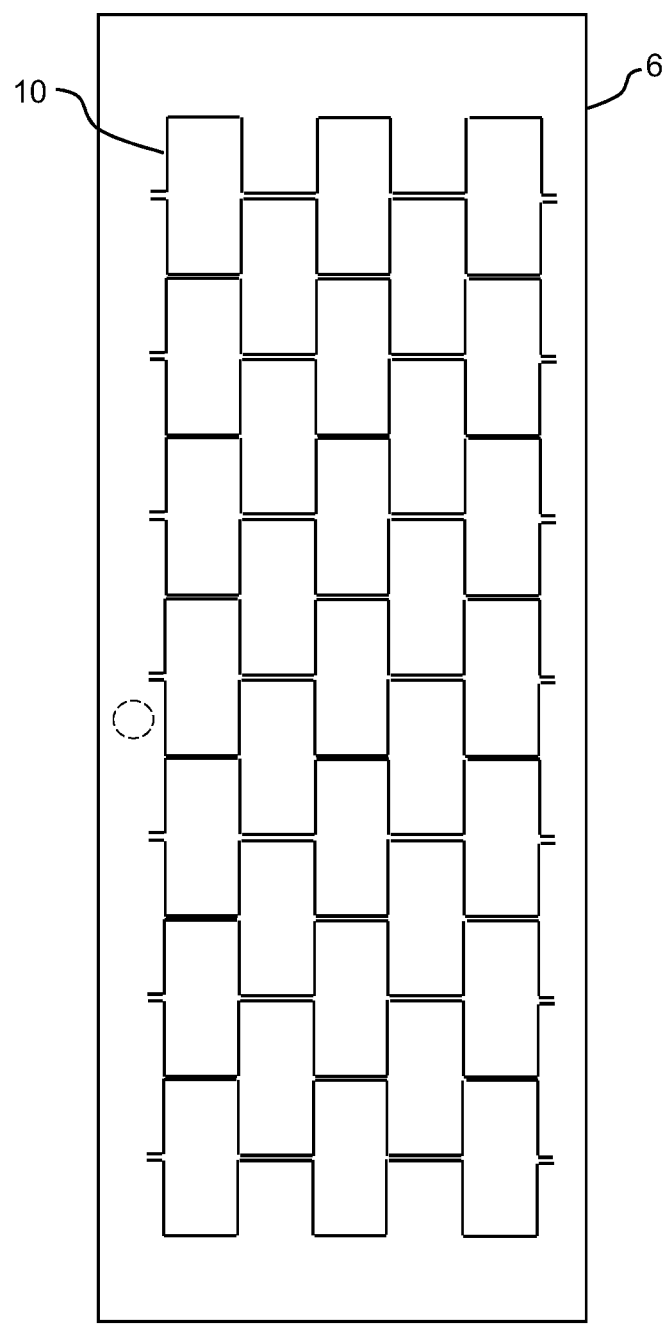
FIG. 13 is a top view of the inside of a hollow door with another embodiment of the present spacer in an expanded configuration.

FIG. 13 shows alternate embodiment of the spacer 10 installed in a hollow-core door 6. Each cell 14 has six sides and, although the corners are very close to 90 degrees, the cells are referred to herein as hexagons. The apex of each intermediate cell is attached to the trough of the neighboring cell, forming a double-wall structure where they are connected.

Figure 14:
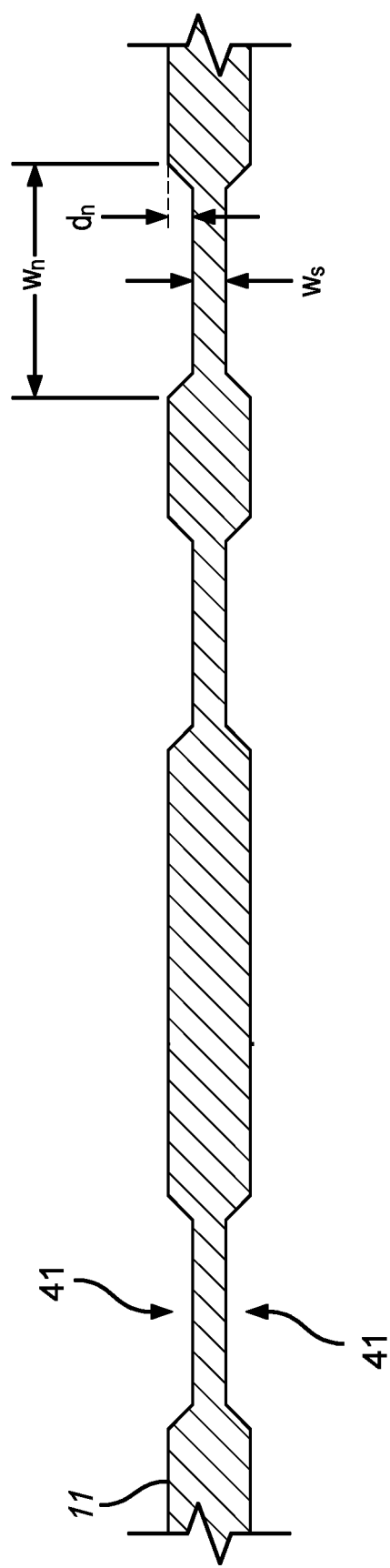
FIG. 14 is a side view of a strip with notches to accommodate raised panels.

To accommodate variations in the distance between the bottom and top skins of the hollow-core structure, such as the contours created in raised-panel doors, each strip may have one or more bottom notches 41 that fits closely over the contour in the bottom skin and one or more top notches 41 that fits closely over the contour in the top skin. FIG. 14 shows a side view of a notched strip 11 that has notches 41 to accommodate raised panels in a hollow-core door. Given that raised panels are typically of uniform shape and size on both sides of a door, the notches in the top edge of the strip are typically symmetric with the notches on the bottom edge. However, it is contemplated that one side of the door may be planar, with no raised panels. In such case the bottom edge of the strips may have notches while the top edge of the strips do not need notches, although they may still be present.

Each notch 41 can be a different depth $d_n$ and width $w_n$ to accommodate the depth and width of each raised panel (not shown). Preferably each notch 41 fits snugly against apex or mesa of the raised panel, so that the raised panels rest snugly on the notches and the spacer supports the skins apart at a uniform distance along the entire length of the spacer 11. That is, preferably the depth of the notch $d_n$ is the same as the depth of the raised portion, and the tolerance is near zero for optimum crush strength of the hollow-core door. In other cases each notch 41 may be wider or less deep than the contour to accommodate size differences or location inaccuracies where the panels are formed.

The present spacer is made of significantly less paper than existing spacers, which reduces cost and weight. The present spacer also requires less glue than existing spacers, also reducing cost. And, the present spacer is easier to install than existing spacers, reducing labor and re-work.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. An expandable, low-elasticity spacer made of two-sided corrugated material having a topsheet, a bottomsheet, and a continuous corrugated sheet therebetween forming flutes, the spacer comprising:
   a. a polygon made of one or more strips of the corrugated material wherein:
      i. the polygon has three or more sides;
      ii. the polygon has inside corners and outside corners; and
      iii. each outside corner has a slit in the topsheet or bottomsheet but not the continuous corrugated sheet, wherein the slit is parallel to the flutes.

2. The spacer of claim 1 further comprising perforations, a score, or a crimp parallel to the flutes in one or more of the inside corners.

3. The spacer of claim 1 wherein the corrugated material is fiberboard, cardboard or paper.

4. The spacer of claim 1 wherein the corrugated material is polypropylene or other plastic.

5. The spacer of claim 1 wherein two or more polygons are connected to each neighboring polygon along one side of each polygon.

6. The spacer of claim 1 wherein the polygon is a rectangle.

7. The spacer of claim 1 wherein the polygon is a hexagon.

8. The spacer of claim 1 further comprising notches in the one or more strips to accommodate raised panels in a hollow-core door.

9. An expandable, low-elasticity spacer made of two-sided corrugated material having a topsheet, a bottomsheet, and a corrugated sheet therebetween forming flutes, the spacer comprising:
   a. a first strip of corrugated material comprising at least five portions a, b, c, d, and e, and further comprising:
      i. a first slit on the bottomsheet between portions a and b;
      ii. a second slit on the topsheet between portions b and c;
      iii. a third slit on the topsheet between portions c and d; and
      iv. a fourth slit on the bottomsheet between portions d and e;
   b. a second strip of corrugated material comprising at least five portions f, g, h, i, and j, and further comprising:
      i. a fifth slit on the bottomsheet between portions f and g;
      ii. a sixth slit on the topsheet between portions g and h;
      iii. a seventh slit on the topsheet between portions h and i; and
      iv. an eighth slit on the bottomsheet between portions i and j; wherein
   c. each slit is parallel to the flutes; and
   d. the first strip and second strip are connected to each other to form a polygon wherein:
      i. the bottomsheet of portion a is attached to the bottomsheet of portion f; and
      ii. the bottomsheet of portion e is attached to the bottomsheet of portion j.

10. The spacer of claim 9 further comprising perforations, a score, or a crimp parallel to the flutes in one or more of:
 a. the topsheet between portions a and b;
 b. the bottomsheet between portions b and c;
 c. the bottomsheet between portions c and d;
 d. the topsheet between portions d and e;
 e. the topsheet between portions f and g;
 f. the bottomsheet between portions g and h;
 g. the bottomsheet between portions h and i; and
 h. the topsheet between portions i and j.

11. The spacer of claim 9 wherein the corrugated material is fiberboard, cardboard or paper.

12. The spacer of claim 9 wherein the corrugated material is polypropylene or other plastic.

13. The spacer of claim 9 wherein the first and second strips are connected to each other with adhesive.

14. The spacer of claim 9 wherein portions b, d, g, and i are each about 3" long.

15. The spacer of claim 9 further comprising notches in the first strip and second strip to accommodate raised panels in a hollow-core door.

16. An expandable, low-elasticity spacer for a hollow-core structure comprising:
 a. a plurality of cells connected in series to form a ladder wherein:
 b. each cell comprises the spacer of claim 9;
 c. the ladder has a first cell, a last cell, and one or more intermediate cells; and
 d. the topsheet of portion c of each of the intermediate cells is connected to the topsheet of portion h of its neighbor.

17. The spacer of claim 16 wherein, when expanded, each cell is a rectangle with a width of about 6 inches.

18. The spacer of claim 16 wherein the corrugated material is fiberboard, cardboard or paper.

19. The spacer of claim 16 wherein the corrugated material is polypropylene or other plastic.

20. The spacer of claim 16 further comprising notches in the first strip and second strip to accommodate raised panels in a hollow-core door.

\* \* \* \* \*